April 18, 1972   C. F. CHENOT   3,657,141
EUROPIUM-SAMARIUM COACTIVATED STRONTIUM FLUOROBORATE PHOSPHOR
Filed Aug. 12, 1970

INVENTOR
CHARLES F. CHENOT
BY Donald R. Castle
ATTORNEY

UNITED STATES PATENT OFFICE

3,657,141
EUROPIUM-SAMARIUM COACTIVATED STRONTIUM FLUOROBORATE PHOSPHOR
Charles F. Chenot, Towanda, Pa., assignor to Sylvania Electric Products Inc., Seneca Falls, N.J.
Filed Aug. 12, 1970, Ser. No. 63,128
Int. Cl. C09k 1/66
U.S. Cl. 252—301.4 R          9 Claims

ABSTRACT OF THE DISCLOSURE

A strontium fluoroborate phosphor coactivated by europium and samarium is disclosed wherein the phosphor can be characterized as follows:

$$Sr_wF_xB_yO_z:Eu_uSm_v$$

wherein $w$ is from about 0.90 to about 0.99, $x$ is from about 0.50 to about 1.00, $y$ is from about 3.00 to about 4.50, $z$ is from about 5.00 to about 7.45, $u$ is from about 0.005 to about 0.05, and $v$ is from about 0.005 to about 0.10. The phosphor is useful in low-pressure or high-pressure electric discharge devices.

BACKGROUND OF THE INVENTION

Field of the invention

This invention relates to a phosphor composition. More particularly, it relates to a europium-samarium coactivated strontium fluoroborate phosphor, useful in low-pressure or high-pressure electric discharge devices.

Prior art

Several phosphors have been reported which involve some form of the strontium borate matrix. Many of these, however, produce ultraviolet light emission and are activated only by europium, such as in the United States patents of Chenot, Nos. 3,431,215 and 3,431,216.

The phosphor of this invention is capable of line emission in the red and near infrared regions of the spectrum upon exposure to suitable excitation and is coactivated by europium and samarium. The term infrared phosphor generally found in the literature can refer to two types of phosphors, infrared stimulated and infrared emitting. Infrared stimulated or sometimes called infrared sensitive phosphors have found applications in memory devices where infrared radiation is used to stimulate usually a visible phosphorescence. Such materials are initially excited by high energy radiation such as ultraviolet, alpha rays, cathode rays and X-rays. Phosphors of this type involving $Sm^{+2}$ have been reported for primarily sulfide matrices where $Sm^{+2}$ is an auxiliary activator codoped in the matrix with a domiant activator such as europium, manganese, cerium, or copper.

Infrared emitting phosphors provide luminescence in the infrared as a result of direct excitation from high energy radiation such as ultraviolet, alpha rays, cathode rays and X-rays. Although phosphors of this type have very limited applications, a few have been reported particularly for the Group II-A and II-B metal sulfide matrices. In addition, a group of red, infrared emitting phosphors involving $Sm^{+2}$ has been reported for Ba, Ca, and Sr, halide and mixed halide matrices. This series is reported to emit narrow bands in the range of 5500 A. and 8500 A.

Infrared-emitting oxygen dominant or oxy-salt phosphor systems are quite rare. Perhaps the apparent difficulty in finding an activator with proper spectral transitions can best describe this condition. Although it has the proper spectral transitions for infrared emission, $Sm^{+2}$ is not efficiently excited by conventional high and low pressure mercury discharge devices. Therefore, $Sm^{+2}$ has enjoyed its greatest popularity as an auxiliary activator in infrared stimulated phosphor systems. It is believed, therefore, that a phosphor with an oxygen dominant matrix suitable for $Sm^{+2}$ red, infrared emissions, wherein the aforementioned $Sm^{+2}$ is sensitized by an efficient primary activator, europium$^{+2}$, thereby giving rise to the red, infrared emissions and which is useful in low-pressure or high-pressure electric discharge devices, is an advancement in the art.

SUMMARY OF THE INVENTION

In accordance with one aspect of the invention, there is provided a luminescent phosphor composition consisting essentially of strontium fluoroborate, coactivated by europium and samarium. The phosphor composition has the formulation:

$$Sr_wF_xB_yO_z:Eu_uSm_v$$

wherein $w$ is from about 0.90 to about 0.99, $x$ is from about 0.50 to about 1.00, $y$ is from about 3.00 to about 4.50, $z$ is from about 5.00 to about 7.45, $u$ is from about 0.005 to about 0.05, and $v$ is from about 0.005 to about 0.10.

DETAILED DESCRIPTION OF THE DRAWINGS AND PREFERRED EMBODIMENTS

For a better understanding of the preferred embodiments of the invention, together with other and further objects, advantages, and capabilities thereof, reference is made to the following disclosure and appended claims in connection with the above-described drawings.

Figure 1:
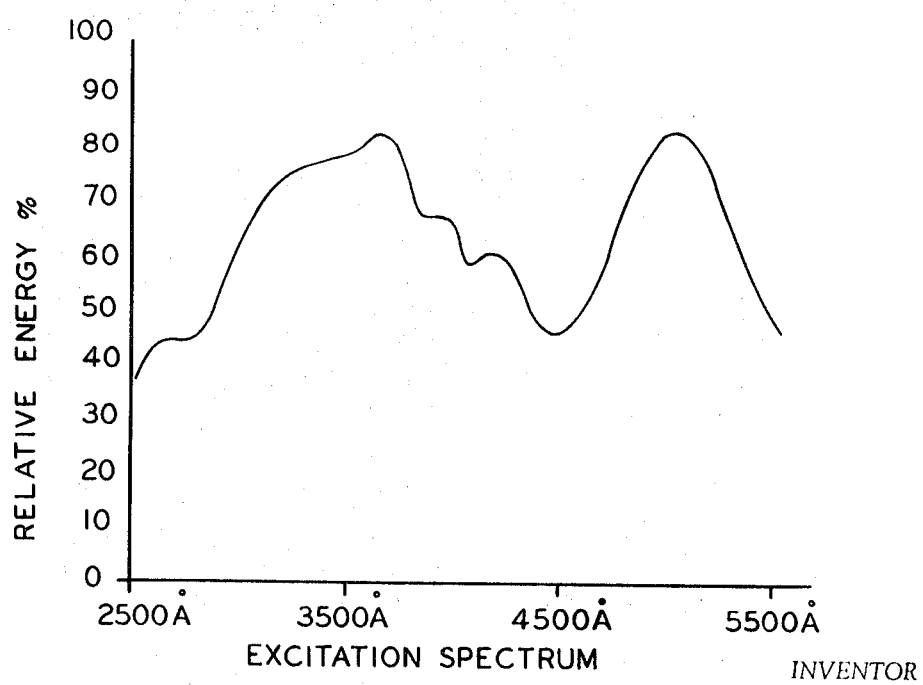
FIG. 1 is an excitation spectrum of a strontium fluoroborate phosphor coactivated by europium and samarium.

Referring now to FIG. 1, the excitation spectrum of the phosphor of this invention is shown at room temperature. The phosphor of the invention has broad excitation bands in the ultraviolet ranges of about 2500 to 2800 A. and about 3000 to 3900 A., characteristic of $Eu^{+2}$ and strong excitation bands at about 3950, 4200, and 5020 A. resulting from $Sm^{+2}$. The excitation spectrum shown in FIG. 1 appears broad and well into the visible; thus, the phosphor can have use in both high and low pressure mercury dischharge devices.

Figure 2:
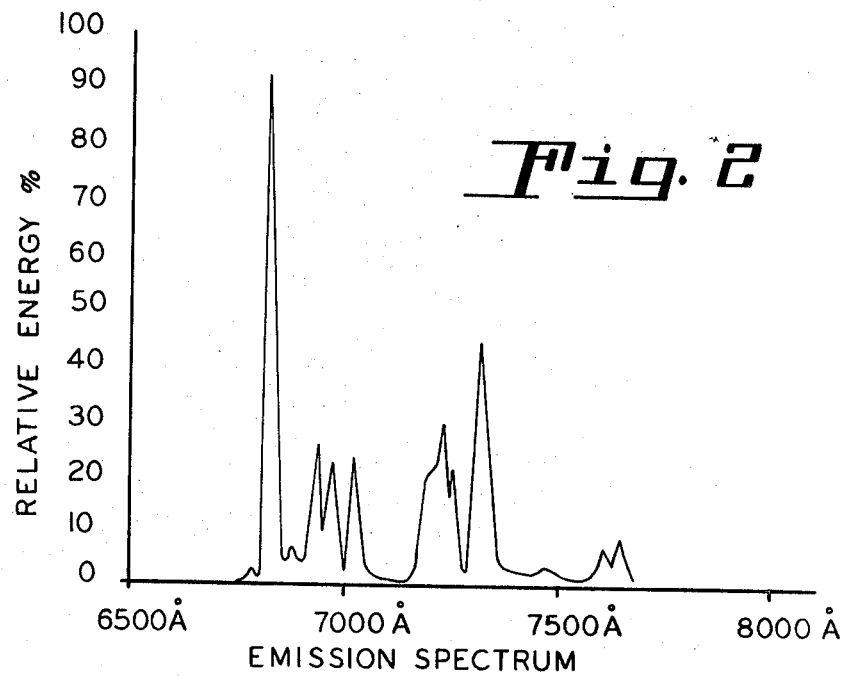
FIG. 2 is an emission spectrum of the above-described phosphor.

In FIG. 2 a spectral energy distribution curve of the phosphor of this invention is shown at room temperature and is excited with a 2537 A. discharge line of mercury. The aforementioned phosphor has $Eu^{+2}$ as a sensitizing activator where the energy transfer process to samarium, the coactivator, appears quite efficient and gives rise to the red, infrared line emissions as shown in FIG. 2.

It has been found that the phosphor should have the following formulation, based upon starting materials:

$$Sr_wF_xB_yO_z:Eu_uSm_v$$

wherein $w$ is from about 0.90 to about 0.99, $x$ is from about 0.50 to about 1.00, $y$ is from about 3.00 to about 4.50, $z$ is from about 5.00 to about 7.45, $u$ is from about 0.005 to about 0.05, and $v$ is from about 0.005 to about 0.10.

When greater than the upper or lower limits of the individual constituents are used, the phosphor will not fluoresce appreciably.

While any amount between the aforementioned ranges of the individual constituents can be used, it has been found that the preferred values for the individual constituents are as follows: $w$ is about 0.96, $x$ is about 0.62, $y$ is about 4.00, $z$ is about 6.69, $u$ is about 0.029, and $v$ is about 0.011.

The especially preferred composition which generally provides the most intense red, infrared luminescence under a wide range of ultraviolet excitation is:

$$Sr_{0.96}F_{0.62}B_{4.00}O_{6.69}:Eu_{0.029}:Sm_{0.011}$$

To further illustrate the invention, the following detailed example is given. All parts, proportions, and percentages are by weight unless otherwise given.

EXAMPLE 1

Strontium nitrate, boric acid, europium oxide and samarium oxide ($Eu_2O_3$ and $Sm_2O_3$ dissolved initially in dilute nitric acid) in the form of fine powders are dissolved completely in water at about 90° C. in the molecular proportions:

$$0.6Sr(NO_3)_2:5H_3BO_3:0.015Eu_2O_3:0.006Sm_2O_3$$

Ammonium hydroxide solution is added rapidly to the above solution with vigorous stirring until the complex coprecipitation of a white fine precipitate is complete and a basic slurry results. The slurry is digested for about 2 hours at a temperature of about 80° C., cooled to atmospheric temperature, filtered and the resultant precipitate dried.

To the dried precipitate about 0.323 mole $SrF_2$ is added and blended. The material is initially heated for about 1 to about 2 hours at a temperature of about 800° C. in an open quartz crucible under air or light oxidizing conditions.

The heated material is cooled to atmospheric temperature, ground to a fine powder and second-step-heated for about 2 hours at a temperature of about 900° C. in an open quartz crucible under mild reducing conditions, e.g., 1–2% $H_2$ in $N_2$.

The resultant product exhibits a red infrared luminescence with narrow emission peaks at about 6840, 6930, 6970, 7030, 7230, 7250, and 7320 A. as illustrated in FIG. 2.

While there has been shown and described what is at present considered to be the preferred embodiments of the invention, it will be obvious to those skilled in the art that various changes and modifications may be made therein without departing from the scope of the invention as defined by the appended claims.

What is claimed is:

1. A infrared emitting phosphor composition consisting essentially of strontium fluoroborate, coactivated by europium and samarium, having the formulation:

$$Sr_wF_xB_yO_z:Eu_uSm_v$$

wherein $w$ is from about 0.90 to about 0.99, $x$ is from about 0.50 to about 1.00, $y$ is from about 3.00 to about 4.50, $z$ is from about 5.00 to about 7.45, $u$ is from about 0.005 to about 0.05, and $v$ is from about 0.005 to about 0.10.

2. A composition according to claim 1, wherein $w$ is about 0.96.

3. A composition according to claim 2 wherein $x$ is about 0.62.

4. A composition according to claim 3, wherein $y$ is about 4.00.

5. A composition according to claim 4, wherein $z$ is about 6.69.

6. A composition according to claim 5, wherein $u$ is about 0.029.

7. A composition according to claim 6, wherein $v$ is about 0.011.

8. A composition according to claim 7, wherein europium is in the +2 valence state.

9. A composition according to claim 8, wherein samarium is in the +2 valence state.

References Cited

UNITED STATES PATENTS 2,527,365 10/1950 Leverenz _____ 252—301.4 S
3,431,215 3/1969 Chenot _____ 252—301.4 R ROBERT D. EDMONDS, Primary Examiner